No. 808,099. PATENTED DEC. 26, 1905.
E. LIPPITT.
KNITTING MACHINE.
APPLICATION FILED JULY 15, 1902.

WITNESSES:
W. H. Cotton
Arthur Diebold

INVENTOR
Elihu Lippitt
BY
Louis T. Gillson
ATTORNEY.

UNITED STATES PATENT OFFICE.

ELIHU LIPPITT, OF CHICAGO, ILLINOIS, ASSIGNOR TO GEORGE D. WHITCOMB COMPANY, A CORPORATION OF ILLINOIS.

KNITTING-MACHINE.

No. 808,099.

Specification of Letters Patent.

Patented Dec. 26, 1905.

Application filed July 15, 1902. Serial No. 115,737.

*To all whom it may concern:*

Be it known that I, ELIHU LIPPITT, a citizen of the United States, and a resident of Chicago, county of Cook, and State of Illinois, have invented certain new and useful Improvements in Knitting-Machines, of which the following is a specification and which are illustrated in the accompanying drawings, forming a part thereof.

This invention relates to the sinker and latch-opener mechanism of a knitting-machine, its object being to provide a sinker which, while performing the usual functions of such a knitting-machine attachment, will also serve as a needle-guide and fabric-depressor and to provide a new and improved form of latch-opener.

Further advantages of the invention will be pointed out in connection with the description of the device, which is illustrated in the accompanying drawings, in which—

Figure 1:
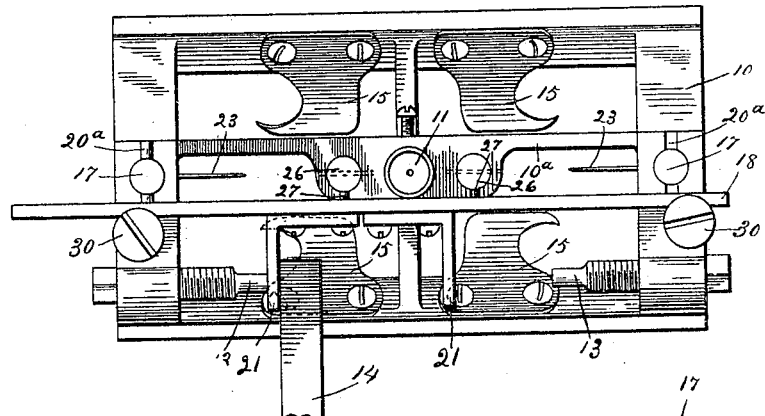
Figure 2:
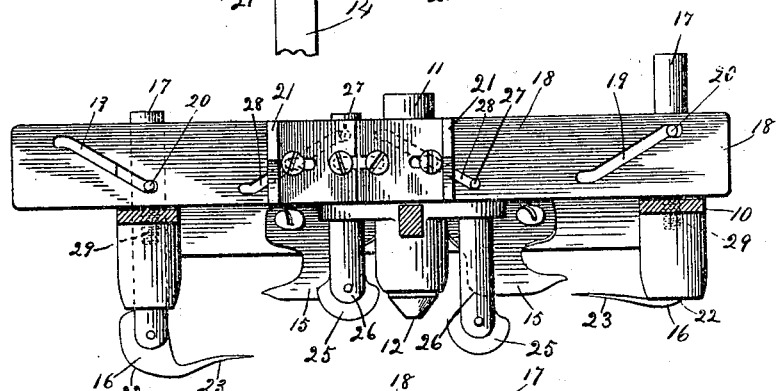
Figure 3:
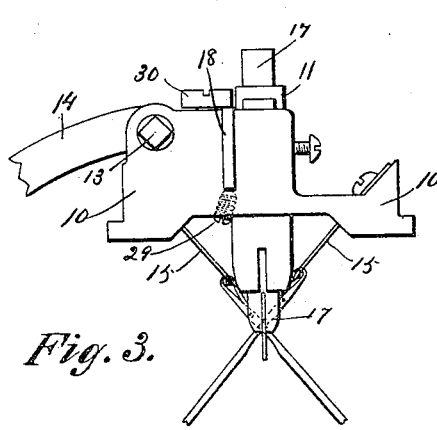
Figure 4:
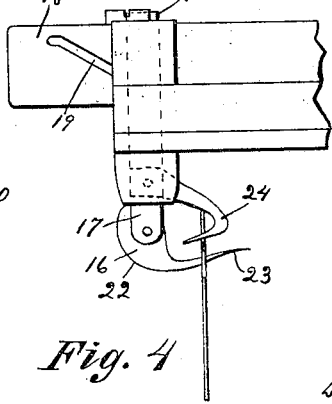
Figure 5:
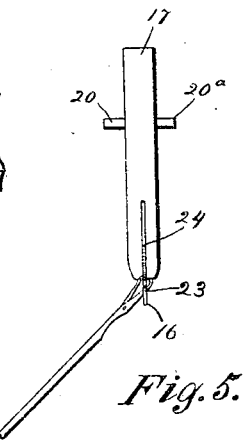

Figure 1 is a plan view of a yarn-carrier frame and its appurtenances with a detail of the actuating-arm therefor. Fig. 2 is a longitudinal vertical section through such a yarn-carrier frame. Fig. 3 is an end view of the same. Fig. 4 is a detail showing a side elevation of the improved form of sinker and latch-opener. Fig. 5 is a detail of such sinker and latch-opener removed from the machine, showing a front view thereof.

The invention as illustrated is adapted for use in connection with a straight-rail knitting-machine, and there is shown at 10 an oblong rectangular yarn-carrier frame provided with a longitudinal bar $10^a$, carrying the yarn-tube 11, the discharge-nipple of which is shown at 12. Adjustable abutments are shown at 13 13 for receiving the arm 14, forming an appurtenance of the carriage of the machine and by which the yarn-carrier frame is actuated. Latch-opener plates 15 are also shown as being secured to the yarn-carrier frame.

I make no claim for the adjustable abutments 13 or for the form of latch-openers shown at 15, for the reason that they are the joint invention of George D. and William C. Whitcomb and myself and are included in an application, Serial No. 96,109, filed February 28, 1902.

A sinker-shoe 16 is located at each end of the frame 10 and in line with the nipple 12 of the yarn-tube, and as the two sinkers and their appurtenances are duplicates a description of one will serve as a description for both. The sinker-shoe is secured to a shaft 17, reciprocating in vertical bearings in the frame 10 and controlled by a slide-bar 18, located and reciprocating longitudinally as to the frame 10 and being provided with an oblique slot 19, which is inclined downwardly from the end of the bar, a stud 20 projecting laterally from the shaft 17, engaging such slot, so that the movement of the bar 18 causes the reciprocation of the shaft 17 by a cam action.

When the shaft 17 is round, as shown, it is held against angular movement not only by the stud 20, which projects through a vertical slot in the box within which the shaft is journaled, but a similar stud $20^a$ may project in the opposite direction from the shaft and into a similar slot in the box.

A pair of lugs 21 project laterally from the bar 18, crossing the axial line of the abutments 13 and themselves receiving the impact of the arm 14 and transmitting it to the abutments 13. The lugs 21 are spaced a less distance apart than the abutments 13 13, so that upon the change of direction of travel of the arm 14 the bar 18 is caused to slide in its bearings, thereby depressing the sinker 16, which is at the forward end of the carriage, in its new direction of movement and elevating the sinker at its rearward end.

The sinker 16 has a rounded or curved face 22, so that it may gently engage and depress the stitch as it is being cast off from the needle, and is provided with a backwardly-projecting arm 23—that is to say, an arm projecting toward the yarn-tube. This arm has a slight upward curve and is so located that the needle as it advances rides over and is guided by it, the lower face of the arm serving to hold the cast-off stitch down while its side face positively holds the loop upon the needle, so that the needle-shaft and latch will with certainty slide through it, insuring its casting off as a completed stitch upon the retraction of the needle.

As a needle-guide the arm 23 insures the engagement of the latch-opener with the hook of the needle, and it performs its function better, because of its pressure upon the cast-off stitch, thereby insuring strain upon the needle-shaft and holding it positively in engagement with the upper face of the arm.

Latch-openers of the type shown at 15 may be dispensed with, the form of latch-opener shown at 24 being substituted therefor. This improved latch-opener is in the form of a hook secured to the shaft 17 and projecting backwardly over the arm 23 of the sinker and being recurved, so that its point is in position to engage the needle-hook when it is directly over the sinker-arm. Being thus disposed a single latch-opener coöperates with both banks of needles, the latch being thrown back somewhat earlier in the stroke of the needle than with the type of the latch-opener shown at 15, an action which has no disadvantages and, indeed, which tends to coöperate with the loop in throwing the latch back.

When coarse yarn is used, it will be found desirable to use an auxiliary sinker 25, which is in the form of a thin-faced shoe carried by a vertically-reciprocating shaft 26, located intermediate of the yarn-tube 11 and the shaft 17 and having a lateral stud 27 engaging an oblique slot 28 in the slide-bar 18. It will be understood that two such auxiliary sinkers are employed, one upon each side of the yarn-tube. The cam-slots 28 are inclined in the opposite direction from the slots 19, so that the auxiliary sinker which follows the yarn-tube is the one in action and engages the stitch as it is being cast off and forces it from the end of the needle, the sinker 16 serving rather as a depressor than as a sinker when the auxiliary sinker is employed. In practice the use of these auxiliary sinkers will not be found necessary except when the yarn is coarse, as already stated.

It will be observed that the cam-slots 19 and 28 are slightly prolonged horizontally at each end. By this means provision is made for varying the throw of the slide-bar 18 to compensate for the adjustment of the abutment-screws 13 without changing the range of movement of the sinkers. A further function of the horizontal prolongations at the lower ends of these slots is found in the fact that when the sinker is in service the forward pressure thereon is positively instead of merely frictionally resisted. The uniform range of movement of the sinkers may, however, be provided for by making the lugs 21 adjustable upon the bar 18, these lugs being secured to the bar by means of laterally-projecting shanks having elongated apertures for the reception of the screws by which they are secured, as shown in Fig. 2.

Provision should be made for adjustably determining the depth to which the sinker shall travel. This may be accomplished in various ways. As shown, it is done by the use of screws 29, setting up through the yarn-carrier frame, one at each end thereof, into the slot within which the bar 19 travels and serving as the support for this bar. These screws are made to fit tightly within their sockets, so that they will remain in the position to which they are set, and by their use it is obvious that the bar 18 may be raised or lowered and that the travel of the sinker will be correspondingly varied. In order to prevent vertical play of the bar 18, I prefer to locate broad-headed screws 30 in the cross-rails of the yarn-carrier frame, so that their heads will overlap the bar and form a bearing therefor.

In addition to the functions of the improved form of sinker herein shown and described which have been already enumerated an additional advantage is found in that the take-up rolls may be entirely dispensed with, the necessary tension upon the fabric being at all times maintained by the sinker. Thus the usefulness of the knitting-machine is increased, as it becomes possible to knit in succession a plurality of parts of an article which are to be subsequently united—as, for example, the fingers of a glove—retaining them all on the needles and then uniting them by throwing all of the needles into action.

I do not desire to be limited to the particular means shown for raising and lowering the sinker-shafts, as this action may be accomplished in other ways without departing from the scope of the invention. I believe myself to be the first to employ a sinker which is mounted upon the yarn-carrier and is automatically thrown into and out of action.

While I have shown the latch-opener in hook form and as mounted with the peculiar form of sinker described, I regard my invention as having sufficient scope to include any latch-opener which is mounted in line with the yarn-tube, so that it will act upon the needles of both banks.

I claim as my invention—

1. In a knitting-machine, in combination, a yarn-carrier, a driving member engaging the yarn-carrier, a vertically-movable sinker on the yarn-carrier, and an operative connection between the driving member and the sinker.

2. In a knitting-machine, in combination, a yarn-carrier, a driving member engaging the yarn-carrier, a vertically-movable sinker mounted on the yarn-carrier, a horizontally-movable slide-bar operatively connected with the driving member and having an oblique cam-slot in engagement with the sinker.

3. In a knitting-machine, in combination, a yarn-carrier, a driving member engaging the yarn-carrier, a vertically-movable sinker mounted on the yarn-carrier, a horizontally-movable slide-bar having a pair of lugs extending into the path of the driving member, and an oblique cam-slot in engagement with the sinker.

4. In a knitting-machine, in combination, a yarn-carrier, a driving member engaging the yarn-carrier, a vertically-movable sinker mounted on the yarn-carrier, a horizontally-movable slide-bar operatively connected with the driving member and having an oblique cam-slot in engagement with the sinker, and vertically-adjustable bearings for the slide-bar.

5. In a knitting-machine, in combination, a yarn-carrier, a driving member engaging the yarn-carrier, a vertically-movable sinker mounted on the yarn-carrier and located on the median line thereof, and an operative connection between the driving member and the sinker.

6. In a knitting-machine, in combination, a yarn-carrier, a driving member engaging the yarn-carrier, a vertically-movable sinker mounted on the yarn-carrier and located on the median line thereof, a horizontally-movable slide-bar operatively connected with the driving member, and having an oblique cam-slot in engagement with the sinker.

7. In a knitting-machine, in combination, a yarn-carrier, a driving member engaging the yarn-carrier, a vertically-movable sinker mounted on the yarn-carrier and located on the median line thereof, a horizontally-movable slide-bar having a pair of lugs extending into the path of the driving member and an oblique cam-slot in engagement with the sinker.

8. In a knitting-machine, in combination, a yarn-carrier, a driving member engaging the yarn-carrier, a vertically-movable sinker mounted on the yarn-carrier and located on the median line thereof, a horizontally-movable slide-bar operatively connected with the driving member and having an oblique cam-slot in engagement with the sinker, and vertically-adjustable bearings for the slide-bar.

9. In a knitting-machine, in combination, a yarn-carrier, a sinker mounted on the carrier and in line with the yarn-tube thereof, such sinker comprising a shoe having a rounded advance edge and a backwardly-projecting finger.

10. In a knitting-machine, in combination, two sets of needles movable in intersecting paths, a yarn-carrier, and a latch-opener mounted on the carrier and on the median line of the throat of the machine and engaging needles of both sets in their flight.

11. In a knitting-machine, in combination, a yarn-carrier, and a sinker mounted thereon and having a needle-guiding finger.

12. In a knitting-machine, in combination, a yarn-carrier, a sinker mounted thereon and having a needle-guiding finger, and a latch-opener in line with the yarn-tube of the carrier.

13. In a knitting-machine, in combination, a yarn-carrier, a sinker mounted thereon and having a needle-guiding finger, and a latch-opener attached to the sinker and located above the guiding-finger.

14. In a knitting-machine, in combination, a yarn-carrier, a sinker mounted thereon and having a needle-guiding finger, and a latch-opener attached to the sinker and being in hook form, its point being above the guiding-finger.

15. In a knitting-machine, in combination, a yarn-carrier, a driving member engaging the same, a vertically-movable sinker having a needle-guiding finger, a latch-opener carried by the sinker, and operative connection between the driving member and the sinker.

16. In a knitting-machine, in combination, a yarn-carrier, a driving member engaging abutments thereon which are spaced apart, a vertically-movable sinker mounted on the yarn-carrier and having a needle-guiding finger and a latch-opener, and a cam-bar operatively connected with the sinker and in engagement with the driving member intermediate of the abutments of the yarn-carrier.

17. In a knitting-machine, in combination, a pair of needle-beds spaced apart to form a throat, a yarn-carrier located over the throat, a driving member engaging adjustable abutments on the carrier on the median line of the throat, a sinker mounted on the carrier and having a definite range of vertical movement, and operative connection between the sinker and the driving member.

18. In a knitting-machine, in combination, a yarn-carrier, a driving member connected therewith, a vertically-movable sinker mounted on the carrier, a horizontally-sliding bar having an oblique cam-slot having its lower end prolonged horizontally and being in engagement with the sinker, and operative connection between the slide-bar and the driving member.

19. In a knitting-machine, in combination, a yarn-carrier, a driving member connected therewith, a vertically-movable sinker on the median line of the yarn-carrier, operative connection between the driving member and the sinker, and means for adjustably determining the downward limit of movement of the sinker.

20. In a knitting-machine, in combination, a yarn-carrier, a driving member connected therewith, a sliding cam-bar operatively connected with the driving member, vertically-adjustable bearings for the slide-bar, and a vertically-movable sinker located on the median line of the yarn-carrier and in engagement with the cam of the slide-bar.

21. In a knitting-machine, in combination, a yarn-carrier, a driving member connected therewith, a pair of vertically-movable sinkers at each side of the yarn-tube of the carrier and located on the median line of the latter, and means actuated by the driving member for moving the members of each pair of sinkers in opposite directions.

22. In a knitting-machine, in combination, a yarn-carrier, a driving member in engagement therewith, a slide-bar actuated by the driving member and having two oppositely-inclined cam-slots in each end, a pair of vertically-movable sinkers at each side of the yarn-tube of the carrier and located on the median line of the latter, each sinker being in engagement with one of the cam-slots.

23. In a knitting-machine, in combination, a yarn-carrier, a driving member engaging the carrier, a slide-bar reciprocated by the driving member and having an oblique cam-slot at each end, such slots being oppositely inclined, a vertically-reciprocating sinker at each end of the carrier and located on the median line of the latter and in engagement with the adjacent cam-slot of the slide-bar.

24. In a knitting-machine, in combination, a yarn-carrier, a vertically-movable sinker mounted on the yarn-carrier and located on the median line of the latter, and means for moving the sinker.

25. In a knitting-machine, in combination, a yarn-carrier, means for driving the yarn-carrier, a movable sinker mounted on the yarn-carrier and located on the median line of the latter, and operative connection between the driving means and the sinker.

26. In a knitting-machine, in combination, a yarn-carrier, a driving member engaging the yarn-carrier, a movable sinker mounted on the yarn-carrier and located on the median line of the latter, and a movable member actuated by the driving member and actuating the sinker.

27. In a knitting-machine, in combination, a pair of beds each having a set of reciprocating needles, a carrier reciprocating over the beds, needle-actuating cams mounted on the carrier, a pointed latch-opener mounted on the carriage and having its point located on the line of intersection of the paths of the needles of opposite banks, the latch-opener point being timed relatively as to the needle action so as to engage the needle-eyes as they cross its path.

28. In a knitting-machine having two banks of needles, a yarn-carrier, and a latch-opening point carried thereby and located on the line of intersection of the points of the two sets of needles and engaging needles of both sets in their flight.

29. In a knitting-machine, in combination, a yarn-carrier, a sinker depending from the yarn-carrier on the vertical median plane of the throat of the machine, and being located in advance of the yarn-tube and spaced apart therefrom so that the advancing needles may rise between such parts, said sinker having a backwardly-projecting finger at its lower end.

ELIHU LIPPITT.

Witnesses:
   Louis K. Gillson,
   Arthur B. Seibold.